United States Patent [19]
Valette

[11] 3,891,654
[45] June 24, 1975

[54] 6,7 SUBSTITUTED 3-HYDROXYMETHYL- 1 PHENYL, BENZYL OR PHENYLETHYL SUBSTITUTED ISOQUINOLINES

[75] Inventor: Raymond Valette, Saulx Les Chartreux, France

[73] Assignee: Albert & Rowland S.A., Paris, France

[22] Filed: Sept. 21, 1972

[21] Appl. No.: 290,813

[30] Foreign Application Priority Data
Sept. 22, 1971 United Kingdom............ 44240/71

[52] U.S. Cl....... 260/289 C; 260/268 C; 260/283 S; 260/287 R; 260/330.5; 424/258
[51] Int. Cl............................................. C07d 33/38
[58] Field of Search.................... 260/289 R, 289 A

[56] References Cited
UNITED STATES PATENTS
| | | | |
|---|---|---|---|
| 2,683,713 | 7/1954 | Shepard............................ | 260/289 R |
| 3,334,106 | 8/1967 | Biel................................... | 260/287 R |
| 3,712,895 | 1/1974 | Yamato............................. | 260/287 R |

OTHER PUBLICATIONS
Mueller et al., Chemical Abstracts, 64223r, p. 6040, 1967.

*Primary Examiner*—Donald G. Daus
*Assistant Examiner*—David E. Wheeler
*Attorney, Agent, or Firm*—Stevens, Davis, Miller & Mosher

[57] ABSTRACT

The present invention provides new 3-hydroxymethyl-isoquinolines having useful therapeutic, especially spasmolytic and cardiovascular, properties corresponding to the general formula:

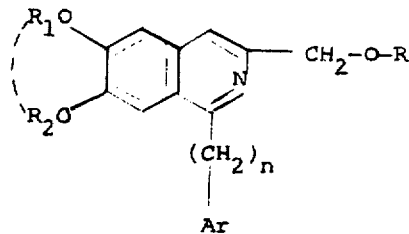

in which R represents a hydrogen atom or an acyl group; $n$ is 0, 1 and 2; $R_1$ and $R_2$, which may be identical or different, each represents a hydrogen atom, a benzyl group or a $C_1$–$C_3$ alkyl group, or $R_1$ and $R_2$, together with the oxygen atoms in positions 6 and 7 to which they are bonded, form an alkylenedioxy chain, in particular a methylenedioxy chain; and Ar represents an aromatic group; and their acid addition salts.

5 Claims, No Drawings

6,7 SUBSTITUTED 3-HYDROXYMETHYL-1 PHENYL, BENZYL OR PHENYLETHYL SUBSTITUTED ISOQUINOLINES

The present invention relates to papaverine derivatives, more particularly to 3-hydroxymethyl-isoquinolines which are substituted in positions 1, 6 and 7.

It is known that papaverine (6,7-dimethoxy-1-(3,4-dimethoxy-benzyl)-isoquinoline) and perparine (6,7-diethoxy-1-(3,4-diethoxy-benzyl)-isoquinoline) have a therapeutic activity of short duration. The purpose of this invention is to produce analogues of papaverine and perparine which have a longer lasting action and which possess better spasmolytic and cardiovascular properties.

It has, surprisingly, been found that it is possible, firstly, to introduce a $CH_2OH$ group into the 3-position of isoquinoline without destroying the substituents present in positions 6 and 7 and without hydrogenating positions 1, 2, 3 and 4 and, secondly, to obtain either water-soluble analogues or esters, especially esters with a long fatty chain, by esterification of the 3—$CH_2OH$ group with suitable acid chlorides.

The present invention provides:

a. the isoquinolines of the general formula:

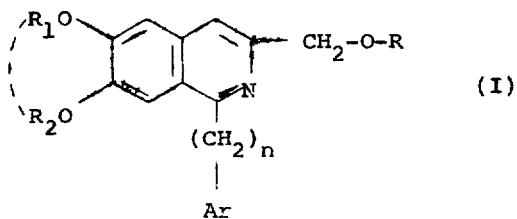

(I)

in which R represents a hydrogen atom or an acyl group; n is 0, 1 or 2; $R_1$ and $R_2$, which may be identical or different, each represents a hydrogen atom, a benzyl group or a $C_1$–$C_3$ alkyl group, or $R_1$ and $R_2$ together with the oxygen atoms in positions 6 and 7 to which they are bonded form an alkylenedioxy chain, in particular a methylenedioxy chain, and Ar represents an aromatic group; and b. their acid addition salts.

By "aromatic group" as used herein is meant not only optionally substituted aryl and aralkyl groups, but also their optionally substituted hetero-aromatic isosteres.

According to one embodiment of this invention, Ar represents an α-naphthyl, β-naphthyl, 2-furyl, 2-thienyl, 2-(5-nitrofuryl), 2-(5-nitrothienyl),

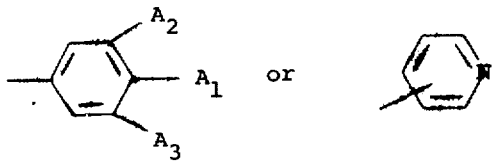

group, wherein $A_1$, $A_2$ and $A_3$, which may be identical or different, each represents a hydrogen atom, a phenyl group, a benzyl group, a $C_1$–$C_3$ alkyl group, a hydroxyl group, a phenoxy group, a benzyloxy group or a $C_1$–$C_3$ alkyloxy group, or $A_1$ and $A_2$, together form an alkylenedioxy chain, preferably a methylenedioxy chain, which may be identical to, or different from, that of the chain $OR_1R_2O$, $A_3$ in that case being a hydrogen atom.

According to this invention, the acyl groups which R may represent include aliphatic, cycloaliphatic and aromatic acyl groups, the aromatic group being, as stated above, true aromatic or hetero-aromatic groups, the preferred acyl groups being the following:

i. groups of the "cycloalkyl-alkyl-CO" type, such as 3-cyclopentylpropionyl and 3-cyclohexylpropionyl;

ii. groups of the linear, saturated or unsaturated "alkyl-CO" type, containing at least 2 carbon atoms, and preferably at least 7 carbon atoms, such as lauroyl, myristoyl, palmitoyl, stearoyl, 9-undecylenoyl and heptanoyl; and iii. acyl groups containing at least one free COOH group, such as hemimalonyl, hemisuccinyl, hemiglutaryl, hemiadipoyl, hemipimeloyl, hemisuberoyl and hemifumaroyl.

The isoquinolines of this invention may be prepared by:

a. dehydrogenating a substituted 3,4-dihydro-isoquinoline of the general formula:

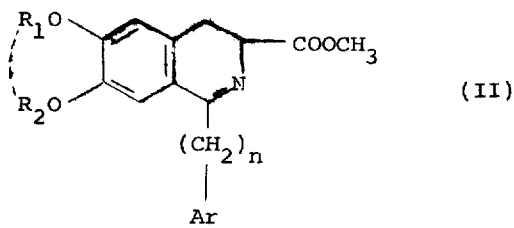

(II)

wherein $R_1$, $R_2$, Ar and n are as defined above;

b. treating the isoquinoline 3-methylcarboxylate of the formula:

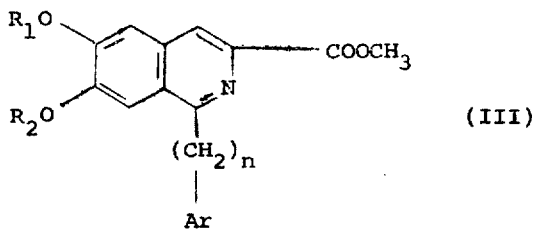

(III)

thus obtained with a hydride reducing agent in order to yield the compound of formula (I) in which R = H; and c. optionally, esterifying the 3-methanolic derivative thus formed to yield a compound of formula (I) in which R = acyl.

According to one embodiment of this process, dehydrogenation of the starting products II is carried out by means of sulphur. Dehydrogenation is preferably carried out at about 150°C. in the presence of more than 1 mol of sulphur per 1 mol of 3,4-dihydro-isoquinoline II.

Suitably the hydride reducing agent is chosen from amongst the group consisting of $LiAlH_4$, $NaBH_4$, $KBH_4$ and $LiBH_4$. Preferably, an amount greater than or equal to 1 mol of $LiAlH_4$, $NaBH_4$, $KBH_4$ or $LiBH_4$ is used per 1 mol of ester of formula (III).

Dehydrogenation by means of sulphur, followed by reduction by means of a hydride such as $LiAlH_4$, $NaBH_4$, $KBH_4$ and $LiBH_4$ has the advantage of not destroying the $OR_1$ and $OR_2$ groups in positions 6 and 7 of the starting products of formula (II). In effect, the only method known hitherto for the preparation of a 3-hydroxymethyl derivative of 1-aryl-isoquinoline involves the direct treatment of a 3-phenoxymethyl-3,4-dihydro-1-aryl-isoquinoline with a 48% strength aqueous solution of HBr for 8 hours under reflux, (see A. BOSE et al., *J. Ind. Chem. Soc.*, 38, No. 4,216 (1961)). Since such a treatment destroys all the $OR_1$ and $OR_2$ substituents, this method cannot be applied to the preparation of the products of formula (I).

The compounds of formula (I) can, in addition, be converted into addition salts with acids, by bringing them into contact with an inorganic or organic acid, such as hydrochloric, hydrobromic, hydriodic, methanesulphonic, para-toluenesulphonic or perchloric acid.

In order to prepare the derivatives in which R = aryl, it is possible to react a compound of formula (I) in which R = H with an acid anhydride of formula R—O—R or an acid chloride of formula R—Cl wherein R represents an acyl group as defined above.

The starting materials of formula (II) can be obtained by several methods. It is possible, in particular, to use the method described by A. GALAT (*J. Am. Chem. Soc.*, 72, 4436 (1950) and 73, 3654 (1951)) to obtain the products of the formula:

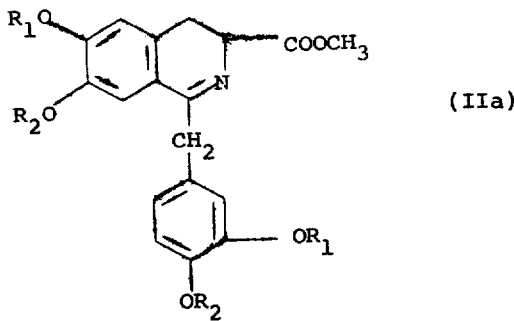

(IIa)

wherein $R_1$ and $R_2$ are defined as stated above. It is also possible to use the method described in Ciba's German Pat. No. 399,805 to obtain the other starting products by cyclising substituted acyl-amino-acetic acids. It is also possible to employ the method of SASAKI, (Ber. 54, pages 163 and 2056 (1921)) starting with diacetopiperazine to prepare the aminoacids and then their amides by acylation before cyclising.

The present invention also relates to the use of the compounds of this invention for therapeutic purposes. The therapeutic compositions of this invention contain, as active ingredient, at least one compound of formula (I), or one of its acid addition salts, combined with a physiologically acceptable vehicle or excipient.

The following Examples further illustrate the present invention:

EXAMPLE 1

6,7-Dimethoxy-3-hydroxymethyl-1-(3,4-dimethoxybenzyl)-isoquinoline a. 5 g (12.5 millimols) of 3,4-dihydro-6,7-dimethoxy-3-methoxycarbonyl-1-(3,4-dimethoxybenzyl)-isoquinoline and 0.6 g (18.7 millimols) of sulphur, finely ground and intimately mixed, are introduced into a 250 ml Erlenmeyer flask.

The reactor is immersed in an oil bath heated to 150°C. After melting, the evolution of $H_2S$ starts rapidly. It is complete after a few minutes. After cooling, the mass is taken up in 100 ml of cold 5% strength HCl. The mixture is filtered to remove the sulphur, and then the product is precipitated by means of $NH_4OH$, filtered off, rinsed with water and dried in an oven, for example at 50°C. 4.33 g of product, which melts at 179°C are obtained. On recrystallisation of this crude product from a methanol/acetone (2:1) mixture, 3.88 g of 6,7-dimethoxy-3-methoxycarbonyl-1-(3,4-dimethoxybenzyl)-isoquinoline, which melts at 180°–189°C, are obtained. (78% yield).

b. 54 g (1 mol) of potassium borohydride are introduced into 1 litre of anhydrous methanol, whilst stirring, and 43 g (1 mol) of lithium chloride are added gradually. The temperature of the mixture rises to about 45°–50°C. 15.3 g (0.038 mol) of the ester obtained under a) are introduced, all at once, whilst stirring, into this hot mixture and stirring is then continued for 4 hours. The temperature slowly returns to ambient temperature. The mixture is then filtered and the inorganic residue is washed with methanol and then taken up in chloroform. Evaporation of the methanol under reduced pressure gives a first crop of crystals. The evaporated chloroform liquors give a second crop. The two crops are recrystallised from a cyclohexane/benzene (1:1) mixture and 10 g of 6,7-dimethoxy-3-hydroxymethyl-1-(3,4-dimethoxybenzyl)-isoquinoline, which melts at 156°–158°C, are obtained. (70% yield).

Two addition salts with acids, namely the hydrochloride which has a melting poiont of 253°C (with decomposition) and the methanesulphonate, were also prepared.

The following example has been given to illustrate the reduction by means of $LiAlH_4$.

EXAMPLE 2

6,7-Dimethoxy-3-hydroxymethyl-1-(3,4-dimethoxybenzyl)-isoquinoline 60 g (approximately 0.15 mol) of 6,7-dimethoxy-1-(3,4-dimethoxybenzyl)-3-methoxycarbonyl-isoquinoline, prepared according to Example 1a, in 750 ml of anhydrous tetrahydrofurane, are placed in a 2 litre Erlenmeyer flask equipped with a stirrer and a nitrogen inlet. The mixture is cooled by means of a bath of water and ice, and stirred and then $LiAlH_4$ is added in small amounts of 100 to 200 mg per portion.

The reduction is complete when the red colour which appears after each addition becomes persistent, and this requires a total of about 1 mol of $LiAlH_4$ per 1 mol of ester. By isolating and purifying the final product as stated in Example 1, the desired substance, which melts at 156°–158°C, is obtained with a yield of 72%.

EXAMPLE 3

Hemisuccinate ester of 6,7-dimethoxy-3-hydroxymethyl-1-(3,4-dimethoxybenzyl)-isoquinoline.

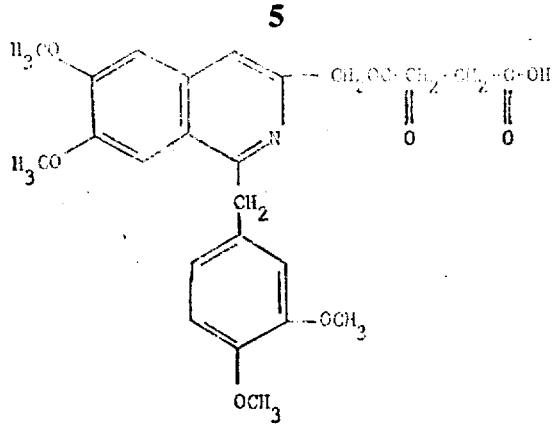

8.82 g (0.024 mol) of the product of Example 1b are introduced into 25 ml of anhydrous pyridine and dissolved by heating on a water bath at 80°C, 2.65 g (0.0265 mol) of succinic anhydride are then added and the temperature of the reaction mixture is then kept at 80°C for 3½ hours. The pyridine is driven off in vacuo on a water bath at 40°C, the residue is taken up in water, the mixture is filtered, and the product is washed with water and dried in an oven at 50°C. 10.65 g (95% yield) of a white crystalline product which melts at 176°C and is very soluble in water, are obtained. Analysis confirms that this product is the hemisuccinate ester of 6,7-dimethoxy-3-hydroxymethyl-1-(3,4-dimethoxybenzyl)-isoquinoline.

On replacing the succinic anhydride by the acid chloride of 3-cyclohexyl-propionic acid, and following a process analogous to that of Example 3 above, the 3-cyclohexyl-propionate ester of 6,7-dimethoxy-3-hydroxymethyl-1-(3,4-dimethoxybenzyl)-isoquinoline is obtained.

Likewise, on replacing the succinic anhydride by acetic anhydride and following the procedure given in Example 3, the corresponding acetate ester, which melts at 134°C, is obtained.

By applying one or other of the methods of Examples 1 and 2, and by carrying out an esterification where necessary according to Example 3, a certain number of compounds which have been listed in Tables I and II below, have been prepared. Table I relates to derivatives in which the symbol Ar represents a true aromatic group and includes the products described above in Examples 1 to 3. Table II relates to derivatives in which the symbol Ar is a hetero-aromatic group. In these tables, the melting points have been stated in every case wherein they were taken.

The products according to the invention have spasmolytic properties which are better than those of papaverine. They possess a cardiovascular effect which is analogous to that of papaverine, but this effect is long-er-lasting than that of papaverine.

The spasmolytic properties have been demonstrated in vitro and in vivo. In vitro, the experiments were carried out, firstly, on the isolated rat duodenum with regard to barium chloride used as the agent causing contracture, and secondly, on the isolated guinea pig ileum with regard to bradykinin used as the agent causing contracture. The results listed in Table III show that the products of the invention are as active as papaverine in vitro.

The cardiovascular effect, and especially the vasodilatory activity, has been investigated in anaesthetised dogs. The results relating to the pulse rate and to the average coronary flow rate have been summarised in Table VI below, relative to control animals, that is to say that a percentage increase or decrease has been stated. The results have been compared with known products, namely papaverine hydrochloride and reference coronary vasodilators such as Persantin or 2,6-bis-(diethanolamino)-4,8-dipiperidino-pyrimido-[5,4-d]-pyrimidine and Intensain or 3-(β-diethylaminoethyl)-4-methyl-7-(carbethoxymethoxy)-2H-1-benzopyran-2-one hydrochloride.

Table VI makes it possible to verify that the compounds of the formula I and their non-toxic addition salts with acids have an activity of the same order of magnitude as that of papaverine but of longer duration.

The values relating to the comparative toxicities have been listed in Table VII below. Although papaverine is in the form of the hydrochloride, which is a substance with a low toxicity, it is obvious from Table VII that the products of the invention are even less toxic than papaverine hydrochloride.

In conclusion, the compounds according to the invention, like papaverine, are thus useful as vasodilators but they also possess valuable anti-spasmodic properties.

TABLE I

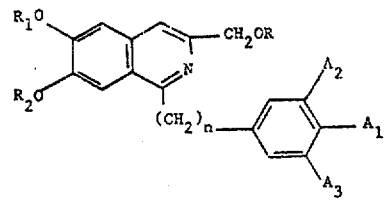

| Product No. | Form | $R_1$ | $R_2$ | $A_1$ | $A_2$ | $A_3$ | n | R | Melting point °C | Code No. |
|---|---|---|---|---|---|---|---|---|---|---|
| 1 | free base | $CH_3$ | $CH_3$ | $OCH_3$ | $OCH_3$ | H | 1 | H | 156-158 | - |
| 2 | hydrochloride | $CH_3$ | $CH_3$ | $OCH_3$ | $OCH_3$ | H | 1 | H | 253(a) | Rd 5002 |
| 3 | methanesulphonate | $CH_3$ | $CH_3$ | $OCH_3$ | $OCH_3$ | H | 1 | H | 196 | Rd 5003 |
| 4 | free base | $CH_3$ | $CH_3$ | $OCH_3$ | $OCH_3$ | H | 1 | $CO-CH_2-CH_2-COOH$ | 204 | Rd 5003 |
| 5 | free base | $CH_3$ | $CH_3$ | $OCH_3$ | $OCH_3$ | H | 1 | $CO-CH_3$ | 134 | Rd 5012 |
| 6 | hydrochloride | $CH_3$ | $CH_3$ | $OCH_3$ | $OCH_3$ | H | 1 | $CO-CH_3$ | 259 | - |
| 7 | free base | $C_2H_5$ | $C_2H_5$ | $OC_2H_5$ | $OC_2H_5$ | H | 1 | H | 114 | - |

TABLE I — Continued

| Product No. | Form | R₁ | R₂ | A₁ | A₂ | A₃ | n | R | Melting point °C | Code No. |
|---|---|---|---|---|---|---|---|---|---|---|
| 8 | hydrochloride | C₂H₅ | C₂H₅ | OC₂H₅ | OC₂H₅ | H | 1 | H | 212 | Rd 5001 |
| 9 | methane-sulphonate | C₂H₅ | C₂H₅ | OC₂H₅ | OC₂H₅ | H | 1 | H | 161 | Rd 5011 |
| 10 | free base | C₂H₅ | C₂H₅ | OC₂H₅ | OC₂H₅ | H | 1 | CO CH₂CH₂COOH | 132 | — |
| 11 | free base | C₂H₅ | C₂H₅ | OC₂H₅ | OC₂H₅ | H | 1 | ⌬-CH₂-CH₂-CO | 150-153 | Rd 5011 |
| 12 | free base | CH₂ | | OCH₂O | | H | 1 | H | 208 | — |
| 13 | hydrochloride | CH₂ | | OCH₂O | | H | 1 | H | 240(a) | Rd 5007 |
| 14 | free base | CH₃ | CH₃ | OCH₃ | OCH₃ | H | 0 | H | 140 | — |
| 15 | hydrochloride | CH₃ | CH₃ | OCH₃ | OCH₃ | H | 0 | H | 247(a) | Rd 5026 |
| 16 | methane-sulphonate | CH₃ | CH₃ | OCH₃ | OCH₃ | H | 0 | H | 157 | Rd 5023 |
| 17 | free base | C₂H₅ | C₂H₅ | OCH₃ | OCH₃ | H | 0 | H | 123 | — |
| 18 | hydrochloride | C₂H₅ | C₂H₅ | OCH₃ | OCH₃ | H | 0 | H | 174 | Rd 5022 |
| 19 | methane-sulphonate | C₂H₅ | C₂H₅ | OCH₃ | OCH₃ | H | 0 | H | 182 | Rd 5045 |
| 20 | free base | CH₃ | CH₃ | OCH₃ | OCH₃ | OCH₃ | 0 | H | 140-142 | — |
| 21 | hydrochloride | CH₃ | CH₃ | OCH₃ | OCH₃ | OCH₃ | 0 | H | 236-240 | Rd 5036 |
| 22 | free base | CH₃ | CH₃ | OCH₃ | OCH₃ | OCH₃ | 2 | H | 136 | — |
| 23 | hydrochloride | CH₃ | CH₃ | OCH₃ | OCH₃ | OCH₃ | 2 | H | 210 | Rd 5025 |

Note: (a) decomposition

TABLE II

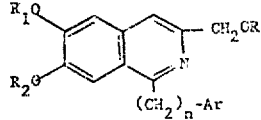

| Product No. | Form | R₁ | R₂ | Ar | n | R | Melting point °C | Code No. |
|---|---|---|---|---|---|---|---|---|
| 24 | free base | CH₃ | CH₃ | 3-pyridyl | 0 | H | — | — |
| 25 | hydrochloride | CH₃ | CH₃ | 3-pyridyl | 0 | H | — | Rd 5030 |
| 26 | free base | CH₃ | CH₃ | 2-thienyl | 0 | H | 134 | Rd 5031 |
| 27 | hydrochloride | CH₃ | CH₃ | 2-thienyl | 0 | H | 204 | Rd 5032 |
| 28 | methane-sulphonate | CH₃ | CH₃ | 2-thienyl | 0 | H | 96 | — |
| 29 | perchlorate | CH₃ | CH₃ | 2-thienyl | 0 | H | 170 (a) | — |
| 30 | free base | CH₃ | CH₃ | 2-thienyl | 0 | CH₃CO | 95 | — |
| 31 | free base | CH₃ | CH₃ | 2-furyl | 0 | H | — | — |
| 32 | free base | CH₃ | CH₃ | 2-(5-nitrofuryl) | 0 | H | — | — |

Note: (a) decomposition

TABLE III

Spasmolytic effect in vitro.

| Products | Rat duodenum (a) | (b) | Guinea pig ileum (a) | (b) |
|---|---|---|---|---|
| Papaverine hydrochloride | $2.5 \times 10^{-6}$ | 1 | $10^{-6}$ | 1 |
| Rd 5002 | $7.5 \times 10^{-6}$ | 0.33 | $10^{-6}$ | 1 |
| Rd 5009 | $1.25 \times 10^{-5}$ | 0.2 | $2.5 \times 10^{-6}$ | 0.4 |
| Rd 5004 | $2.5 \times 10^{-6}$ | 1 | $4.5 \times 10^{-6}$ | 0.2 |
| Rd 5010 | $5 \times 10^{-6}$ | 0.5 | $4.5 \times 10^{-6}$ | 0.2 |
| Rd 5022 | $5 \times 10^{-6}$ | 0.5 | $3 \times 10^{-6}$ | 0.33 |
| Rd 5023 | $>10^{-5}$ | 0.25 | $5 \times 10^{-6}$ | 0.2 |
| Rd 5024 | $6.25 \times 10^{-6}$ | 0.4 | $5 \times 10^{-6}$ | 0.2 |
| Rd 5025 | $10^{-5}$ | 0.25 | $1.4 \times 10^{-6}$ | 0.7 |

Notes:
(a) concentration in g/l which decreases by 50% the effect of $BaCl_2$ on the rat duodenum and of bradykinin on the guinea pig ileum.
(b) relative concentration with respect to papaverine hydrochloride to which the value 1 has arbitrarily been assigned.

The spasmolytic experiments carried out in vivo have shown that all of the products according to the invention are much more active than papaverine. The spasmolytic properties in vivo have been demonstrated firstly, according to the method of KONZETT modified by HALPERN, Arch. Int. Pharcodyn., (1942), 68, pages 339–408, by investigating bronchospasm induced in anaesthetised guinea pigs by bradykinin, acetylcholine and histamine, and secondly, according to the method of LEVY and APFFEL Therapy, 1967, 22, 397, in anaesthetised rabbits by electrical stimulation of the jejunum. The results have been listed respectively in Tables IV and V below.

TABLE IV

Spasmolytic effect in vive in anaesthetised guinea pigs.

| Products | Doses which decrease by 50% the effect of: | | |
|---|---|---|---|
| | Bradykinin (a) | Acetylcholine (b) | Histamine (b) |
| Papaverine hydrochloride | 10 | 425 | 520 |
| Rd 5002 | 5 | 100 | 95 |
| Rd 5009 | 0.55 | 275 | 110 |
| Rd 5004 | 2.5 | 425 | 110 |
| Rd 5010 | 0.66 | 650 | 225 |
| Rd 5022 | 5 | 8 | 87 |
| Rd 5023 | 1 | 300 | 125 |
| Rd 5024 | 4 | 225 | 130 |
| Rd 5025 | 5 | 425 | 250 |

Notes:
(a) doses expressed in mg/kg;
(b) doses expressed in γ/kg.

TABLE V

Spasmolytic effect in vivo in rabbits by electrical stimulation of the jejunna.

| Products | Doses which decrease by 50% the effect of the electrical stimulation. mg/kg |
|---|---|
| Papaverine hydrochloride | 10 |
| Rd 5002 | 10 |
| Rd 5009 | 5 |
| Rd 5004 | 10 |
| Rd 5010 | 2.5 |
| Rd 5022 | 2 |
| Rd 5023 | 2 |
| Rd 5024 | 1.5 |
| Rd 5025 | 1 |

TABLE VI

Cardiovascular effect in anæsthetised dogs.

| Products | Cardiac frequency (a) | Average coronary flow rate (b) |
|---|---|---|
| Papaverine hydrochloride | +19% (0.5 mg/kg) | +198% ( 3 mins.) |
| Persaetin | 0 (0.5 mg/kg) | −129% (42 mins.) (c) |
| Intensain | −32% (5 mg/kg) | −77% (23 mins.) |
| Rd 5002 | +26% (2 mg/kg) | −58% (26 mins.) |
| Rd 5009 | +20% (2 mg/kg) | −70% (25 mins.) |
| Rd 5004 | +12% (5 mg/kg) | −79% (15 mins.) |
| Rd 5010 | +12% (5 mg/kg) | −135% (12 mins.) |
| Rd 5022 | +25% (1 mg/kg) | −172% (16 mins.) |
| Rd 5023 | +25% (1 mg/kg) | −130% (17 mins.) |
| Rd 5024 | +21% (2 mg/kg) | −220% (10 mins.) |
| Rd 5025 | +28% (5 mg/kg) | −153% (22 mins.) |

Notes:
(a) the % given corresponds to the maximum effect for the doses stated in parentheses;
(b) unless otherwise stated, the effect given corresponds to an administration of 2 mg/kg of product, the duration of the action is stated in parentheses (the coronary flow rate is measured by an electromagnetic flow meter at the anterior coronary artery);
(c) at a dose of 0.5 mg/kg.

TABLE VII

Acute toxicity in mice.

| Products | LD-50 or MLD (a) in mg/kg | | |
|---|---|---|---|
| | intravenous administration | subcutaneous administration | oral administration |
| Papaverine hydrochloride | LD-50 = 37.5 | LD-50 = 380 | LD-50 = 2500 |
| Rd 5002 | MLD>30 | MLD>200 | MLD>1650 |
| Rd 5009 | MLD>200 | LD-50 = 1000 | LD-50 = 3000 |
| Rd 5004 | — | — | MLD>3000 |
| Rd 5010 | LD-50 = 160 | MLD>2000 | MLD>2000 |
| Rd 5022 | LD-50 = 200 | MLD>500 | LD-50 = 2000 |

Note:
(a) MLD = Minimum lethal dose.

I claim:

1. A compound of the group consisting of
a. isoquinolines of the formula

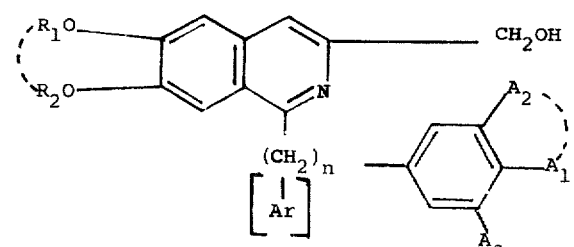

in which n, is 0, 1 or 2, $R_1$ is $CH_3$, $C_2H_5$, $R_2$ has the same meaning as $R_1$, $R_1$ and $R_2$ together with the oxygen atoms to which they are bonded being able to form a methylenedioxy chain, where $A_1$ is $OCH_3$, $OC_2H_5$; $A_2$ is $OCH_3$, $OC_2H_5$, $A_1$ and $A_2$ considered together being able to form a methylenedioxy chain; $A_3$ is H, $OCH_3$, and, b. non-toxic acid addition salts thereof.

2. The isoquinoline of claim 1 which is 6,7-dimethoxy-3-hydroxymethyl-1-(3,4-dimethoxyphenyl)-isoquinoline hydrochloride.

3. The isoquinoline of claim 1 which is 6,7-dimethoxy-3-hydroxymethyl-1-(3,41methane-sulphonate.

4. The isoquinoline of claim 1 which is 6,7-dimethoxy-3-hydroxymethyl-1-(3,4-dimethoxybenzyl)-isoquinoline methane-sulphonate.

5. The isoquinoline of claim 1 which is 6,7-diethoxy-3-hydroxymethyl-1-(3,4-dimethoxyphenyl)-isoquinoline hydrochloride.

* * * * *

UNITED STATES PATENT AND TRADEMARK OFFICE
CERTIFICATE OF CORRECTION

PATENT NO. : 3,891,654
DATED : June 24, 1975
INVENTOR(S) : Raymond Valette

It is certified that error appears in the above–identified patent and that said Letters Patent are hereby corrected as shown below:

[73] Assignee: Albert Rolland S.A.

Signed and Sealed this seventeenth Day of February 1976

[SEAL]

Attest:

RUTH C. MASON
*Attesting Officer*

C. MARSHALL DANN
*Commissioner of Patents and Trademarks*